(12) United States Patent
Raab et al.

(10) Patent No.: US 8,201,407 B2
(45) Date of Patent: Jun. 19, 2012

(54) DRIVE UNIT WITH AN INTERNAL COMBUSTION ENGINE AND A RECIPROCATING PISTON ENGINE WHICH IS SELF-STARTING WITHOUT REGULATION

(75) Inventors: Gottfried Raab, Perg (AT); Markus Raup, Attnang-Puchheim (AT); Josef Klammer, Lienz (AT)

(73) Assignee: MAN Truck & Bus AG, München (DE)

( * ) Notice: Subject to any disclaimer, the term of this patent is extended or adjusted under 35 U.S.C. 154(b) by 658 days.

(21) Appl. No.: 12/435,509

(22) Filed: May 5, 2009

(65) Prior Publication Data

US 2009/0272343 A1 Nov. 5, 2009

(30) Foreign Application Priority Data

May 5, 2008 (AT) .................................. A 698/2008

(51) Int. Cl.
| | |
|---|---|
| *F02G 3/00* | (2006.01) |
| *F02B 71/00* | (2006.01) |
| *F02B 71/04* | (2006.01) |
| *F02B 75/04* | (2006.01) |
| *F02B 71/02* | (2006.01) |
| *F16D 31/02* | (2006.01) |

(52) U.S. Cl. ............ 60/620; 123/46 R; 60/595; 60/596; 60/616; 60/617; 60/494; 60/468

(58) Field of Classification Search .................... 60/595, 60/596, 468, 494, 616–624, 516–526; 123/46 R, 123/46 A, 43 A, 43 R, 44 D, 44 C; 91/486, 91/487

See application file for complete search history.

(56) References Cited

U.S. PATENT DOCUMENTS

| 1,171,620 | A | * | 2/1916 | McIntyre .......................... 417/73 |
|---|---|---|---|---|
| 1,610,868 | A | * | 12/1926 | Lindequist ................... 123/46 R |
| 2,079,135 | A | * | 5/1937 | Turner et al. ..................... 60/468 |
| 2,355,924 | A | * | 8/1944 | Pateras Pescara ............ 417/212 |
| 3,090,317 | A | * | 5/1963 | Luderer ......................... 417/341 |
| 3,796,136 | A | * | 3/1974 | Oguni .............................. 91/485 |
| 3,877,229 | A | * | 4/1975 | Resler, Jr. ....................... 60/597 |
| 4,159,700 | A | * | 7/1979 | McCrum ....................... 123/58.8 |
| 5,056,471 | A | * | 10/1991 | Van Husen ................. 123/51 R |
| 6,135,069 | A | * | 10/2000 | Fenelon et al. ............. 123/46 R |
| 6,722,127 | B2 | * | 4/2004 | Scuderi et al. .................. 60/597 |
| 6,863,507 | B1 | * | 3/2005 | Schaeffer et al. ............. 417/364 |
| 7,721,686 | B2 | * | 5/2010 | Lindgarde ................... 123/46 R |
| 2008/0036312 | A1 | * | 2/2008 | Max et al. ....................... 310/46 |
| 2008/0223040 | A1 | | 9/2008 | Moller et al. |

FOREIGN PATENT DOCUMENTS

DE 10 2006 028 868 12/2007

* cited by examiner

*Primary Examiner* — Thomas Denion
*Assistant Examiner* — Cameron Setayesh
(74) *Attorney, Agent, or Firm* — Cozen O'Connor

(57) ABSTRACT

A drive unit and a method for the operation thereof. The drive unit has an internal combustion engine in operative connection with a driven shaft and a reciprocating piston expansion engine in an operative connection with a crankshaft. The driven shaft is mechanically connected to the crankshaft by a clutch in such a way that torque is transmitted from the crankshaft to the driveshaft. The reciprocating piston expansion engine has at least one cylinder, and a fluid is guided from a fluid supply into an interior of the at least one cylinder at least occasionally via an inlet valve and a bypass valve which is arranged in parallel with the inlet valve.

18 Claims, 6 Drawing Sheets

DRIVE UNIT WITH AN INTERNAL COMBUSTION ENGINE AND A RECIPROCATING PISTON ENGINE WHICH IS SELF-STARTING WITHOUT REGULATION

BACKGROUND OF THE INVENTION

1. Field of the Invention

The invention is directed to a drive unit with an internal combustion engine coupled to a driven shaft and a reciprocating piston expansion engine operatively coupled to a crankshaft, wherein the driven shaft is mechanically coupled to the crankshaft by a freewheel (e.g., an overrunning clutch), such that torque is transmitted from the crankshaft to the driven shaft.

2. Description of the Related Art

In the development and advancement of internal combustion engines, attention in recent years has mainly been focused on minimizing pollutants and increasing the efficiency of the units. One possibility to increase efficiency in a modern internal combustion engine is to make optimum use of the heat generated in the area of the internal combustion engine. By taking appropriate measures, it is possible to limit the structural dimensions of the required cooling system and also to make the heat loss, which is otherwise merely given off into the environment, usable for other applications within the motor vehicle.

To improve engine cooling, combustion engines, have been developed such that the corresponding systems make it possible to utilize heat generated in the area of the combustion engine in the most efficient manner possible. In this connection, it is possible to use the occurring heat for other heatsinks provided in the motor vehicle or to convert the heat energy into mechanical energy, particularly kinetic energy, by means of corresponding cyclical processes.

US 2008/0223040 discloses a drive unit having an internal combustion engine mechanically connected to a piston engine. Wherein a fluid is evaporated in a separate work cycle by the waste heat from the combustion engine and the vapor is conducted into the cylinders of the piston engine, setting in motion the pistons which are movably mounted therein. In this way, a crankshaft of the piston engine, which is mechanically connected to the crankshaft of the internal combustion engine, is set in motion. It is therefore possible with the described system to make use of the waste heat of the internal combustion engine for transmitting torque to the crankshaft of the internal combustion engine by the piston engine.

Based on known design principles, there are basically two conceivable technical solutions for ensuring that the expander, in particular the piston engine, does not constitute an additional load that must be carried along in the warm-up phases of the heat recycling system.

Due to the short induction times when filling the cylinders, depending on accurate engine timing, given a quantity of 7 to 8 cylinders, there is always one intake valve open, and the expander starts by itself when vapor is available. In this case, the crankshaft of the self-starting expander is connected to the crankshaft of the internal combustion engine by a freewheel (overrunning clutch). This freewheel ensures that a transmission of torque occurs exclusively from the crankshaft of the expander to the crankshaft of the internal combustion engine. Once sufficient vapor is available to the cylinders from the heat recycling system, the expander performs work so that torque is transmitted to the crankshaft of the internal combustion engine.

In expanders that are provided in addition to an internal combustion engine and which are not self-starting due to a small number of cylinders, an appropriate clutch is provided in place of the freewheeling connection between the crankshaft of the expander and the crankshaft of the internal combustion engine. The availability of vapor from the heat recycling system is detected by a sensor arrangement and the clutch between the two crankshafts is closed so that the expander is dragged by the internal combustion engine until an intake valve of the expander opens and the expander starts.

SUMMARY OF THE INVENTION

An object of the invention is to provide a drive unit and a method for its operation so that a non-regulated self-starting of a reciprocating piston expansion engine is realized using relatively few resources with respect to construction and regulating technology. In particular, a piston engine with a small number of cylinders is used as an expander and, with or without the use of a clutch between the crankshafts of the expander and internal combustion engine. In this way, it is possible to use the waste heat of an internal combustion engine by a vapor cycling process without additional cost, installation space, and without increased regulation.

Operation of a vapor-operated and/or gas-operated expander, which is mechanically coupled to the crankshaft of an internal combustion engine, without requiring a large number of clutch shifting processes as a result of engaging and disengaging for every braking process and every zero-torque requirement is ensured. The technical solution according to the invention ensures, that an increased efficiency is achieved in the operation of a motor vehicle, preferably a utility vehicle diesel engine, in a simple manner.

A drive unit constructed according to one embodiment the invention has an internal combustion engine which communicates with a driven shaft and a reciprocating piston expansion engine in an operative connection with a crankshaft, wherein the driven shaft is mechanically connected to the crankshaft by a freewheel in such a way that torque is transmitted from the crankshaft to the driven shaft. The drive unit according to the invention is characterized in that the reciprocating piston expansion engine has at least two cylinders, and a fluid is typically guided from a fluid supply into the interior of the at least two cylinders at least occasionally via an inlet valve and a bypass valve which is arranged in parallel with the latter. The fluid supply can be any area inside or outside the expansion machine in which fluid which is at least partially in the form of vapor is conveyed. In addition to the inlet valve and the bypass valve, a cylinder of a reciprocating piston expansion engine also has at least one outlet valve through which the fluid in the form of vapor and/or gas which is expanded inside the cylinder can be conducted into a fluid discharge.

According to one embodiment of the invention, in addition to the inlet valve, a bypass valve through which a fluid can be conducted from the fluid supply into the interior of the cylinder is provided in the area of the cylinder head. A fluid, preferably in the form of vapor and/or gas, is conducted into at least one cylinder interior, even when the inlet valve is closed and a defined limiting value for the system pressure within the fluid supply is exceeded.

The bypass valve provided in a cylinder head of a piston expansion engine, particularly a reciprocating piston expansion engine, combines the advantages of low expenditure on components with the advantages of the self-regulating freewheel. Even if all of the inlet valves are closed while the piston expansion machine is stopped, a fluid in the form of vapor and/or gas flows into the interiors of the cylinders via the bypass valve when sufficient loss heat from the internal combustion engine is available. This results in the piston being displaced in a downward movement in direction of the bottom dead center in at least one cylinder and, due to this movement, an inlet valve is opened in at least one other cylinder. As a result of the opening of the inlet valve, fluid in the form of vapor and/or gas flows into the other cylinder and the reciprocating piston expansion engine begins to run without the need for a clutch or for the piston engine to be dragged by the internal combustion engine. The reliable opening of the inlet valve of a cylinder through the movement of another cylinder in direction of the bottom dead center is preferably achieved by a suitable geometric design of the crankshaft drive. Preferred steps which can be taken to achieve a suitable geometric design of the crankshaft drive consist in a corresponding determination of the cylinder displacement and/or the cylinder angle.

In an advantageous embodiment of the invention, the inlet valves are in operative connection with the crankshaft of the piston expansion engine such that rotation of the crankshaft causes the inlet valves to open and close. The driven shaft preferably has cams arranged asymmetrically with respect to their longitudinal center axis and contact a valve tappet of the inlet valve so that the inlet valves are set in linear motion along their guide when the cams move along a circular path around the longitudinal center axis and an opening and closing of the inlet valves is accordingly carried out.

During operation of a reciprocating piston expansion engine constructed according to one embodiment of the invention, when there is sufficient fluid in the form of vapor and/or gas under the required pressure in the fluid supply after a successful starting process, the fluid flows into the cylinder substantially through the inlet valve and moves the movably mounted piston in direction of the bottom dead center so that the fluid is expanded in the cylinder, whereupon the expanded fluid is removed through the outlet valve due to the upward movement of the piston in direction of the top dead center.

The motion of the piston of the reciprocating piston expansion engine is transmitted to the crankshaft which is in turn mechanically coupled with the driven shaft, that is also coupled with a crankshaft of the internal combustion engine. A freewheel, also known as an overriding clutch, is provided between the crankshaft of the reciprocating piston expansion engine and the driven shaft of the internal combustion engine to ensure that torque is transmitted exclusively from the crankshaft of the reciprocating piston expansion engine to the driven shaft of the internal combustion engine. When there is not a sufficient amount of vapor available within the fluid supply for driving the reciprocating piston expansion engine, for example, in the warm-up phase of the drive unit, the driven shaft of the internal combustion engine rotates faster than the crankshaft of the reciprocating piston expansion engine without the internal combustion engine having to drag the piston engine.

A drive unit constructed according to one embodiment of the invention ensures that at the conclusion of a warm-up phase of the internal combustion engine, when a sufficient amount of a fluid in the form of vapor and/or gas is present within the fluid supply, the reciprocating piston expansion engine can start, although all of the inlet valves are closed. When all of the inlet valves of the reciprocating piston expansion engine are closed, the at least two cylinders may be either in an expansion phase or in the exhaust phase. For this reason, the reciprocating piston expansion engine begins to run in the correct direction in every case during a transition from the stationary state to a movement.

The construction of the reciprocating piston expansion engine according to one embodiment of the invention ensures a safe starting of the expansion engine in the correct direction at the end of the warm-up phase of the internal combustion engine in a simple manner. After the warm-up phase of the internal combustion engine, heat is taken from a cooling circuit of the internal combustion engine by a heat transfer unit and fed to the fluid supply of the reciprocating piston expansion engine. A fluid in the form of vapor and/or gas develops in the fluid supply of the reciprocating piston expansion engine and is conveyed towards an inlet valve and a bypass valve arranged in parallel, with the latter by at least one conveying unit. The system pressure in the fluid supply is increased initially by the conveying unit so that the at least one, preferably spring-loaded, bypass valve opens at a limiting value of the system pressure and fluid flows into the interior of the at least one cylinder.

The opening pressure of the bypass valve is selected such that it lies above the operating pressure of the reciprocating piston expansion engine but below the permissible system pressure of the fluid supply. The opening cross section of the bypass valve is selected to be smaller than the opening cross section of the inlet valve such that the system pressure is first increased inside the fluid supply in spite of the opening of the bypass valve. In a particular embodiment of the invention, it is ensured that, owing to the above-described further increase in the system pressure within the fluid supply after a first opening of a bypass valve, the at least one additional bypass valve of the at least one additional cylinder is also opened before a movement of a first inlet valve occurs. Accordingly, tolerance-dependent differences with respect to the opening pressure required in each instance for the at least two spring-loaded bypass valves is compensated.

Typically, compressed fluid in the form of vapor and/or gas flows through the at least one bypass valve into the interior of at least one cylinder of the reciprocating piston expansion engine in the starting phase, before a movement of one of the inlet valves occurs. When the piston of the respective cylinder is in the exhaust phase, the inlet valve associated with this cylinder is closed, while an outlet valve, also provided, is opened. Because of this configuration, no pressure develops in the cylinder in spite of the influx of fluid in the form of vapor and/or gas because the fluid flowing in via the bypass valve flows out of the cylinder again via the outlet valve. Due to this step, it is ensured that the piston is not moved in the wrong direction because of the fluid flowing in through the bypass valve and that the crankshaft of the piston expansion engine does not rotate in the wrong direction.

When the piston of the cylinder is in the expansion phase, both the inlet valve and the outlet valve are closed. If compressed fluid in the form of vapor and/or gas now flows through the bypass valve into the interior of the cylinder, a pressure build-up takes place inside the cylinder so that the piston moves in direction of bottom dead center. As a result of the movement of the piston, the crankshaft of the reciprocating piston expansion engine is set in rotational motion so that at least one additional piston of the at least one additional cylinder also executes a linear movement. Due to the movement of the crankshaft, at least one inlet valve associated with another cylinder is opened and fluid in the form of vapor and/or gas flows into the interior of this cylinder so that the reciprocating piston expansion engine finally starts. After the starting of the reciprocating piston expansion engine, the system pressure inside the fluid supply drops to the working pressure of the reciprocating piston expansion engine so that the bypass valves do not function during normal operation of the reciprocating piston expansion engine.

In another embodiment, a reciprocating piston expansion engine constructed according to the invention has an odd number of cylinders. The use of five cylinders is particularly suitable.

In one embodiment of the invention, the bypass valve is constructed such that the opening cross section that can be opened by the bypass valve is 0.1-times to 0.5-times, preferably 0.2-times, an opening cross section that can be opened by the inlet valve. Such dimensioning of the opening cross section of the bypass valve ensures that, notwithstanding the tolerance-dependent inequalities between the individual bypass valves, the system pressure within the fluid supply increases after the opening of the bypass valve and an inlet valve is moved only after all of the bypass valves provided in the reciprocating piston expansion engine are opened due to the movement of at least one piston or crankshaft.

The invention is directed to a method for operating a drive unit in which the driven shaft of an internal combustion engine is mechanically connected by a freewheel to the crankshaft of a reciprocating piston expansion engine which has at least two cylinders, wherein a fluid is heated by the waste heat of the internal combustion engine and is changed at least partially into a vaporous and/or gaseous phase. The fluid is introduced into an interior of the cylinder in at least a partially vaporous and/or gaseous state via an inlet valve, and a piston which is movably supported within the cylinder and mechanically coupled with the crankshaft is set in motion by expansion of the fluid. The method according to the invention is characterized in that a bypass valve which is arranged fluidically parallel to the inlet valve is opened and a passage is accordingly opened into the interior of the cylinder even when the inlet valve is closed.

In an embodiment of the invention, at least two cylinders are each provided with an inlet valve and a bypass valve in a reciprocating piston expansion engine and all of the bypass valves are opened before an inlet valve is opened.

Accordingly, similar to the corresponding drive unit, the method according to the invention presents a technical solution which makes it possible for a reciprocating piston expansion engine to self-start without regulation even with a small quantity of cylinders without the need for a clutch to mechanically connect the crankshaft of the reciprocating piston expansion engine to the driven shaft of the internal combustion engine.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

Without limiting the general inventive idea, the invention will be described more fully in the following with reference to the drawings showing embodiment examples.

DETAILED DESCRIPTION OF THE PRESENTLY PREFERRED EMBODIMENTS

Figure 1:
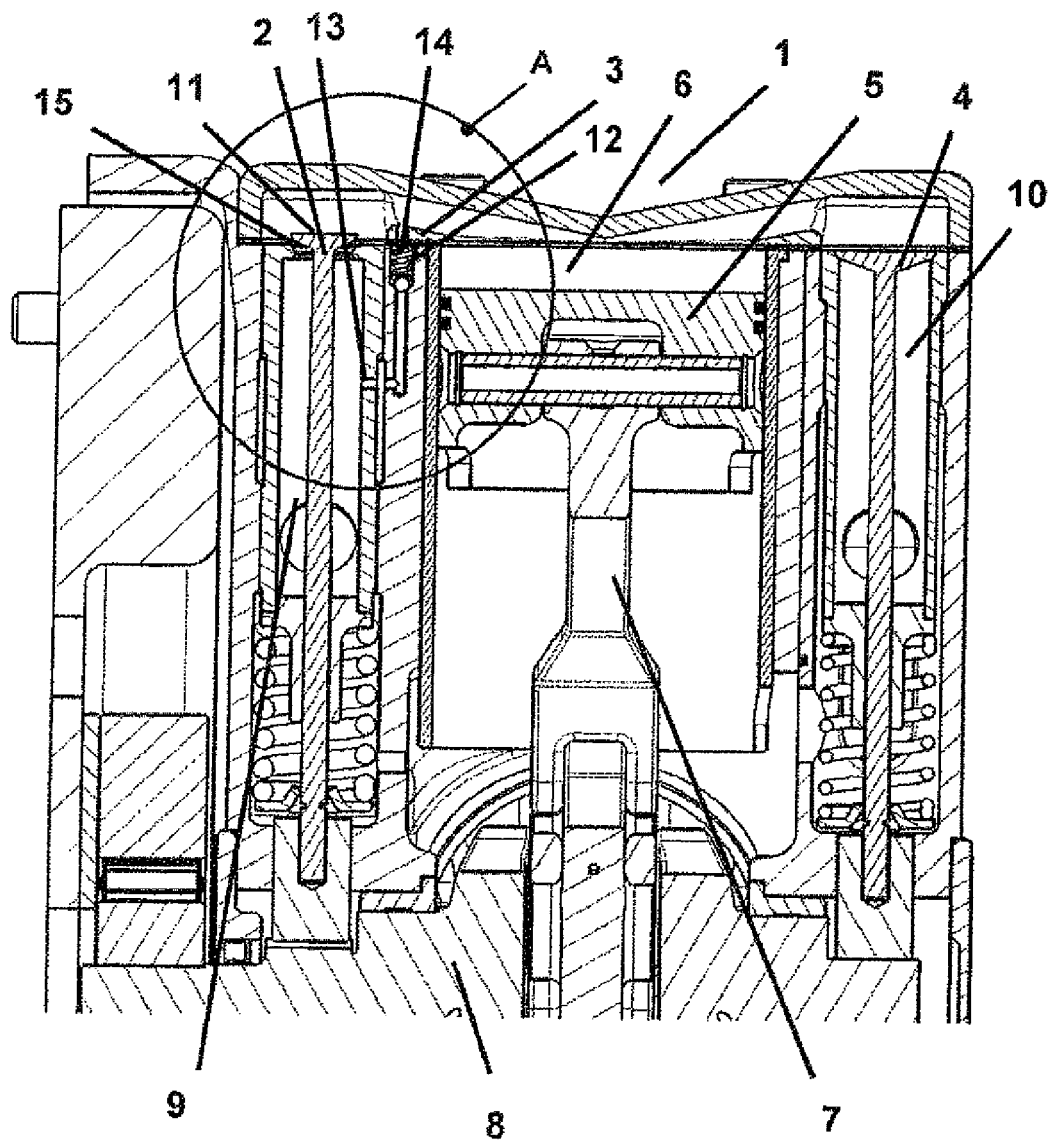
FIG. 1 is a cylinder of a reciprocating piston expansion engine with an inlet valve, outlet valve and bypass valve.

FIG. 1 is a sectional view showing a cylinder 1 of a reciprocating piston expansion engine constructed according to one embodiment of the invention with an inlet valve 2, an outlet valve 4 and a bypass valve 3. The reciprocating piston expansion engine is mechanically connected to the driven shaft of a diesel engine by a freewheel 17 (overrunning clutch). As soon as the diesel engine makes heat available after a starting phase, an at least partial phase transition of a fluid work medium takes place in a heat exchanger. The fluid, which is at least partially vaporous, is conveyed to the inlet valves 2 and the bypass valves 3 by a pump via the fluid supply 9.

The outlet valve 4 is located on the outlet side of the cylinder shown in FIG. 1 and is opened during the exhaust phase of the piston 5 so that the expanded fluid is removed from the cylinder interior 6 into the fluid discharge 10.

The piston 5 of the cylinder 1 is connected via a connecting rod 7 with corresponding bearings to a crankshaft 8 of the reciprocating piston expansion engine The crankshaft 8 of the reciprocating piston expansion engine is set in rotation by a linear movement of the piston 5 within the cylinder interior 6. The crankshaft 8 is constructed in such a way that, depending on the movement of the crankshaft 8, the opening and closing of the inlet valves 2 and outlet valves 4 is carried out in that the valve tappets 11 of the inlet valves 2 and outlet valves 4 are displaced in an upward and downward motion. Further, at least one other piston of the reciprocating piston expansion engine in addition to piston 5 is mechanically connected to the crankshaft 8, so that inlet valves and outlet valves associated with this additional cylinder are moved when the crankshaft 8 moves. Therefore, in order to ensure a starting of the reciprocating piston expansion engine at least one of the pistons 5 of this engine must be set in motion.

After the warm-up phase, there is a vaporous fluid inside the fluid supply 9 of the one or more cylinders 1 that is conveyed to the inlet valves 2 and bypass valves 3 by a pump. When system pressure is built up within the fluid supply 9 and a force is exerted on the bypass valve 3, which exceeds the force exerted on the bypass valve 3 by the spring 12, the bypass valve 3 is opened regardless of the position of the rest of the valves such that vaporous fluid flows into the interior 6 of the cylinder 1.

Figure 2:
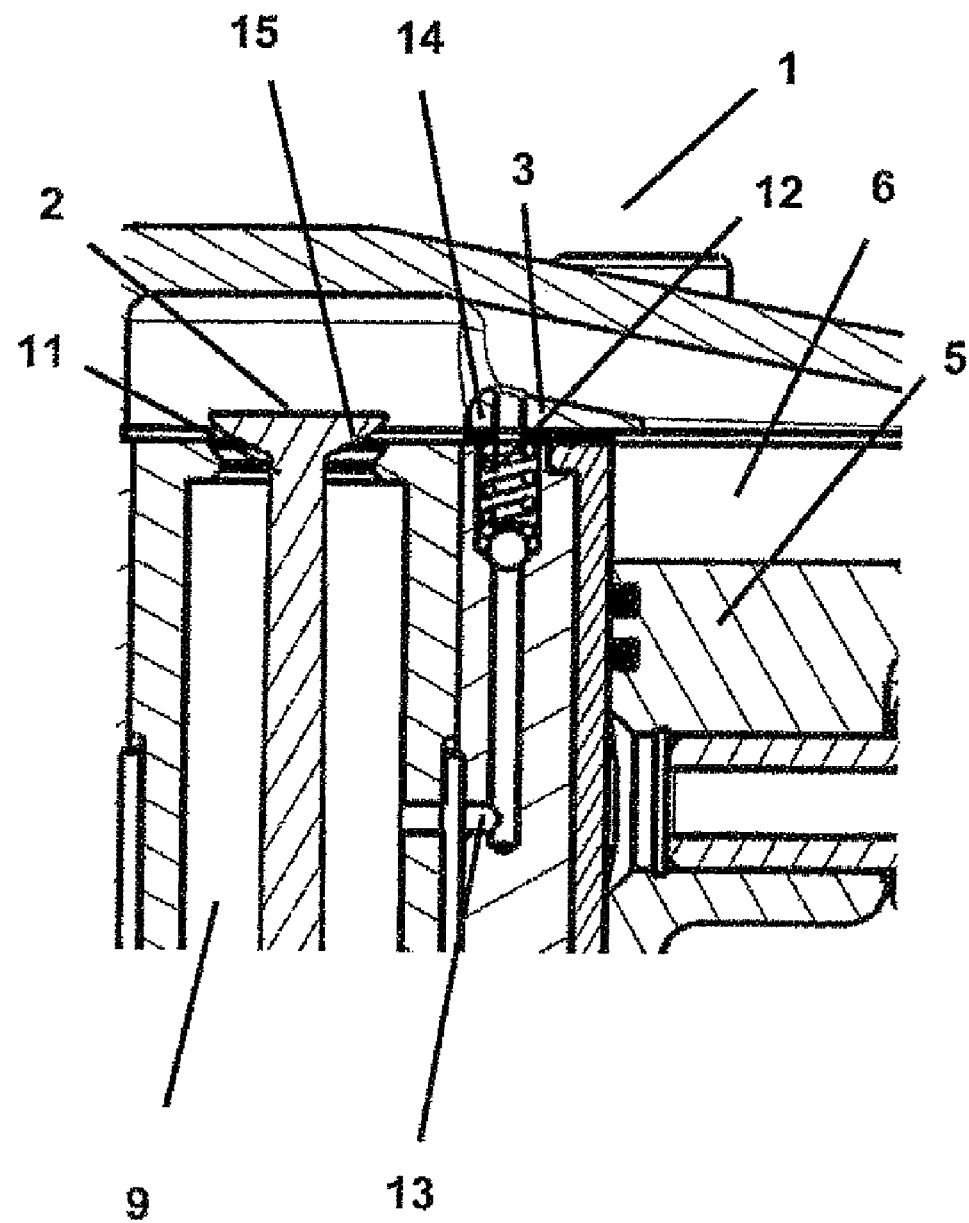
FIG. 2 is a detailed section view of a cylinder head of a reciprocating piston expansion engine with inlet valve and a bypass valve arranged in parallel with the latter.

FIG. 2 shows a detailed view of the area "A" shown in FIG. 1. A section of a cylinder head constructed according to one embodiment the invention is shown that illustrates the arrangement of an inlet valve 2 and a construction of a bypass valve 3. A bore hole 13 is located in the area of the valve tappet 11 of the inlet valve 2. Bore hole 13 provides a flow connection between the fluid supply 9 and the bypass valve 3 or valve opening that can be opened by the bypass valve. When a force, which is greater than the spring force of the spring 12, is exerted on the bypass valve 3 by the system pressure in the fluid supply 9, the bypass valve 3, which is preferably constructed as a spherical valve, is opened and the vaporous fluid flows out of the area of the fluid supply 9 into the cylinder interior 6.

When the working pressure is reached by the influx of fluid into the cylinder interior 6, the piston 5 moves downward in direction of the bottom dead center and, as was already described with reference to FIG. 1, sets the crankshaft in motion so that an inlet valve of another cylinder is opened and the reciprocating piston expansion engine starts.

As shown in FIG. 2, the opening cross section 14 of the bypass valve 3 is appreciably smaller than the opening cross section 15 of the inlet valve 2. The opening cross section 15 of the inlet valve 2 is roughly five-times larger than the opening cross section 14 of the bypass valve 3 in the embodiment shown in FIG. 2. This dimensioning of the opening cross section 14 of the bypass valve 3 ensures that the system pressure within the fluid supply 9 is further increased even when the bypass valve 3 is already open. In this case, the reason for the further increase in system pressure is that the flow resistance of such a small opening cross section 14 is relatively great compared to the amount of vapor conveyed through the conveying unit of the fluid supply 9.

Figure 3:
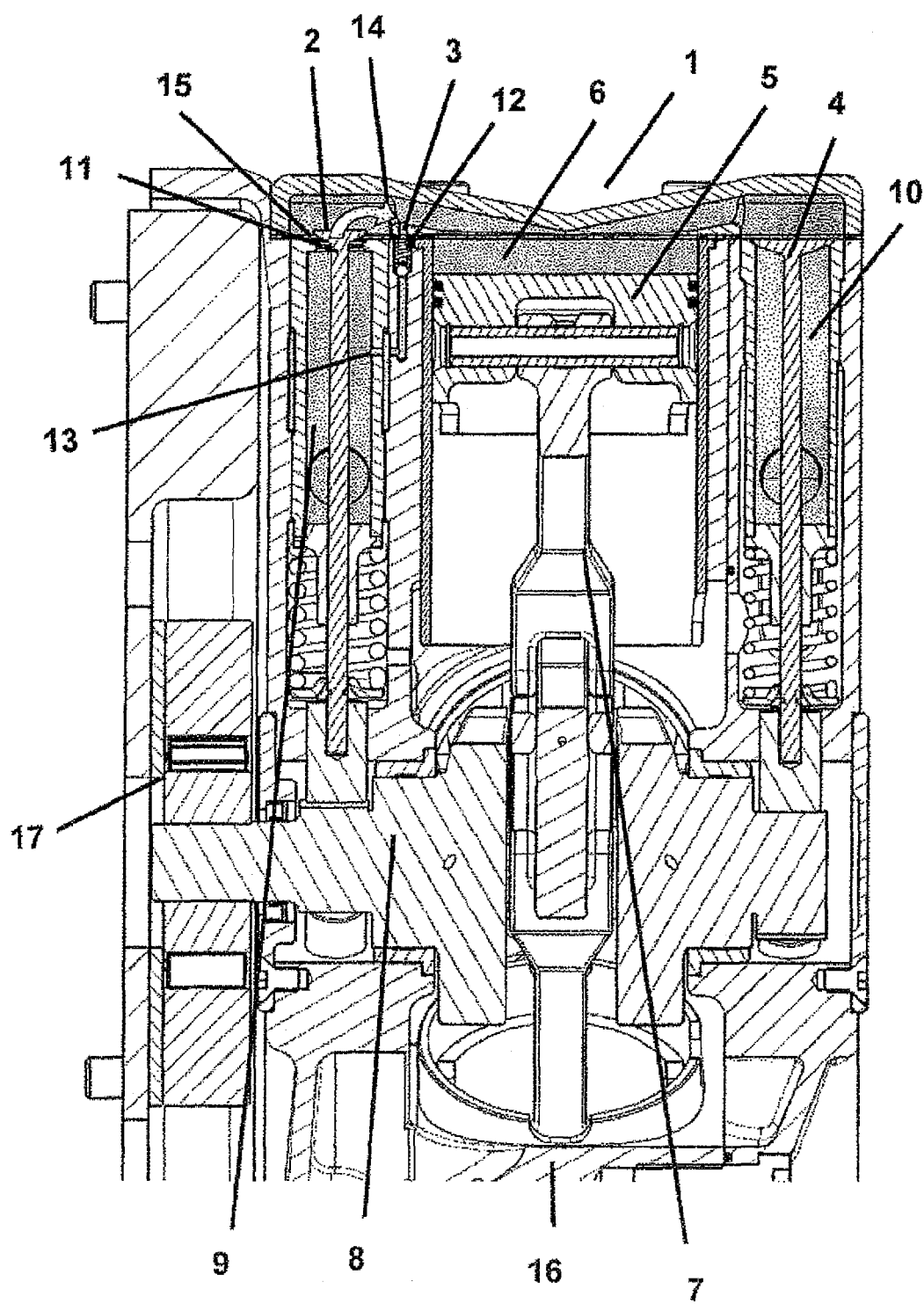
FIG. 3 is the vapor flow when starting from the intake phase.

FIG. 3 shows the valve position of the inlet valve 2, outlet valve 4 and bypass valve 3 of a cylinder 1 during the intake phase and the flow of vapor when starting from the expansion phase. The inlet valve 2 is opened so that vapor from the fluid supply 9 enters the interior 6 of the cylinder 1. The piston 5 accordingly moves in a linear motion downward in the direction of the bottom dead center. Since such a movement of the piston 5 leads to increased volume in the cylinder interior when the inlet valve 2 is closed again, the vapor in the cylinder interior 6 is expanded by the downward movement of the piston 5. The crankshaft 8, valve tappets 11 and at least one additional piston 16, with associated inlet valves, and outlet valves are set in motion by the movement of piston 5. In the operating state of the cylinder 1 shown in FIG. 3, the bypass valve 3 is inoperative.

Figure 4:
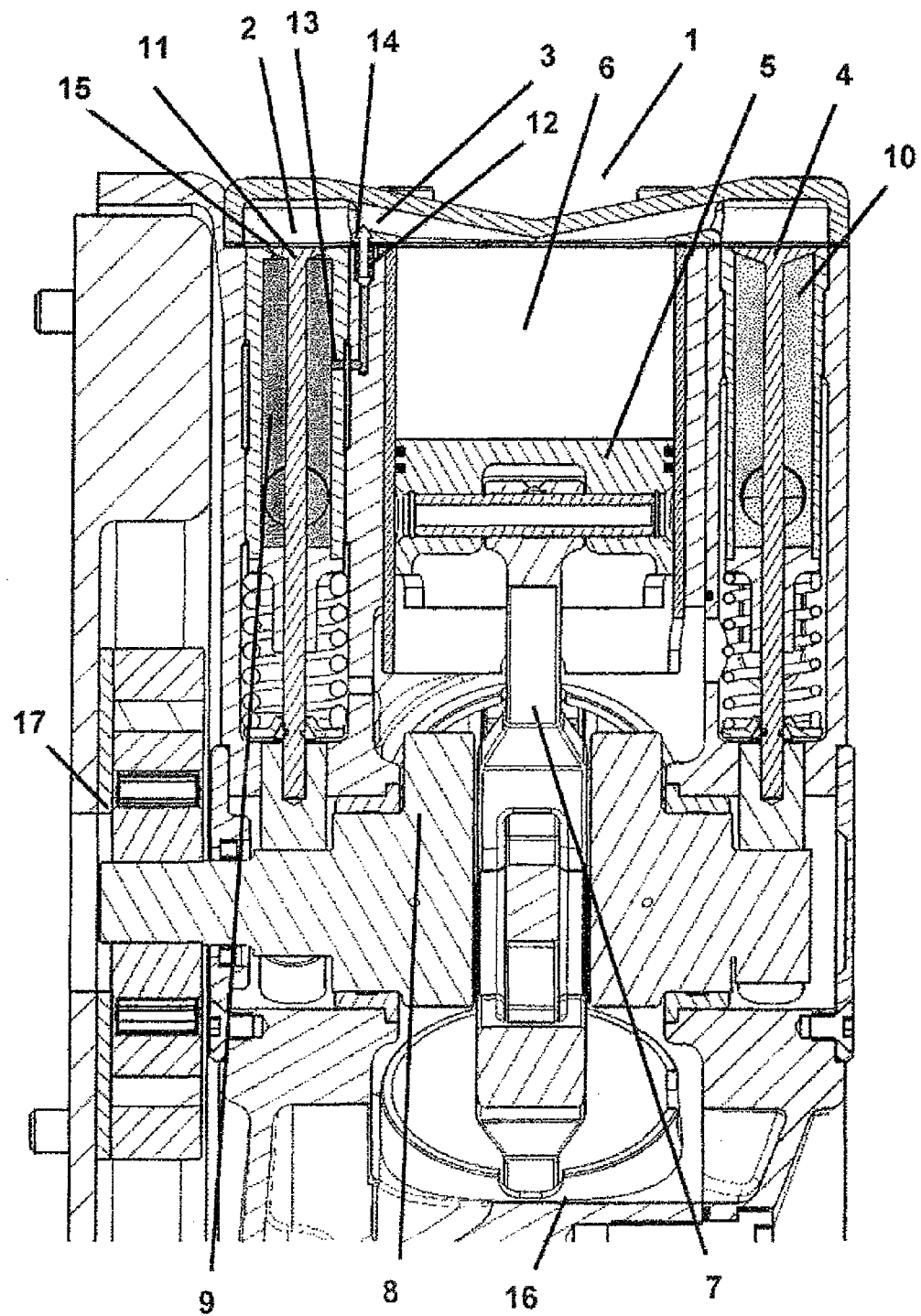
FIG. 4 is the vapor flow when starting from the expansion phase.

FIG. 4 shows the flow of vapor in the expansion phase of a cylinder 1 with the associated position of the piston 5. After the warm-up phase of the internal combustion engine, there is sufficient waste heat available to generate a vapor inside the fluid supply 9. This vapor is circulated within the fluid supply 9 by means of a conveying unit. When a predefinable system pressure is reached within the fluid supply 9 which causes a force to be exerted on the bypass valve 3 exceeding the spring force of the spring 12 which is also being exerted, the bypass valve 3 is opened and vapor flows out of the fluid supply 9 into the interior 6 of the cylinder 1.

The pressure inside the cylinder 1 is increased by the flow of vapor against the closed inlet valves 2 and outlet valves 4. As a result of this pressure build-up, the piston 5 gradually begins to move in direction of the bottom dead center and sets the crankshaft 8 coupled therewith in rotation. Since the crankshaft is constructed in such a way that it causes a movement of the inlet valves 2 and outlet valves 4, the associated inlet valve in another cylinder 16 is opened by the movement of the piston and the crankshaft 8 connected thereto. Owing to this opening of the inlet valve of another inlet valve, not shown in FIG. 4, the reciprocating piston expansion engine starts to run. The bypass valve 3 is again inoperative during the operating phase.

Figure 5:
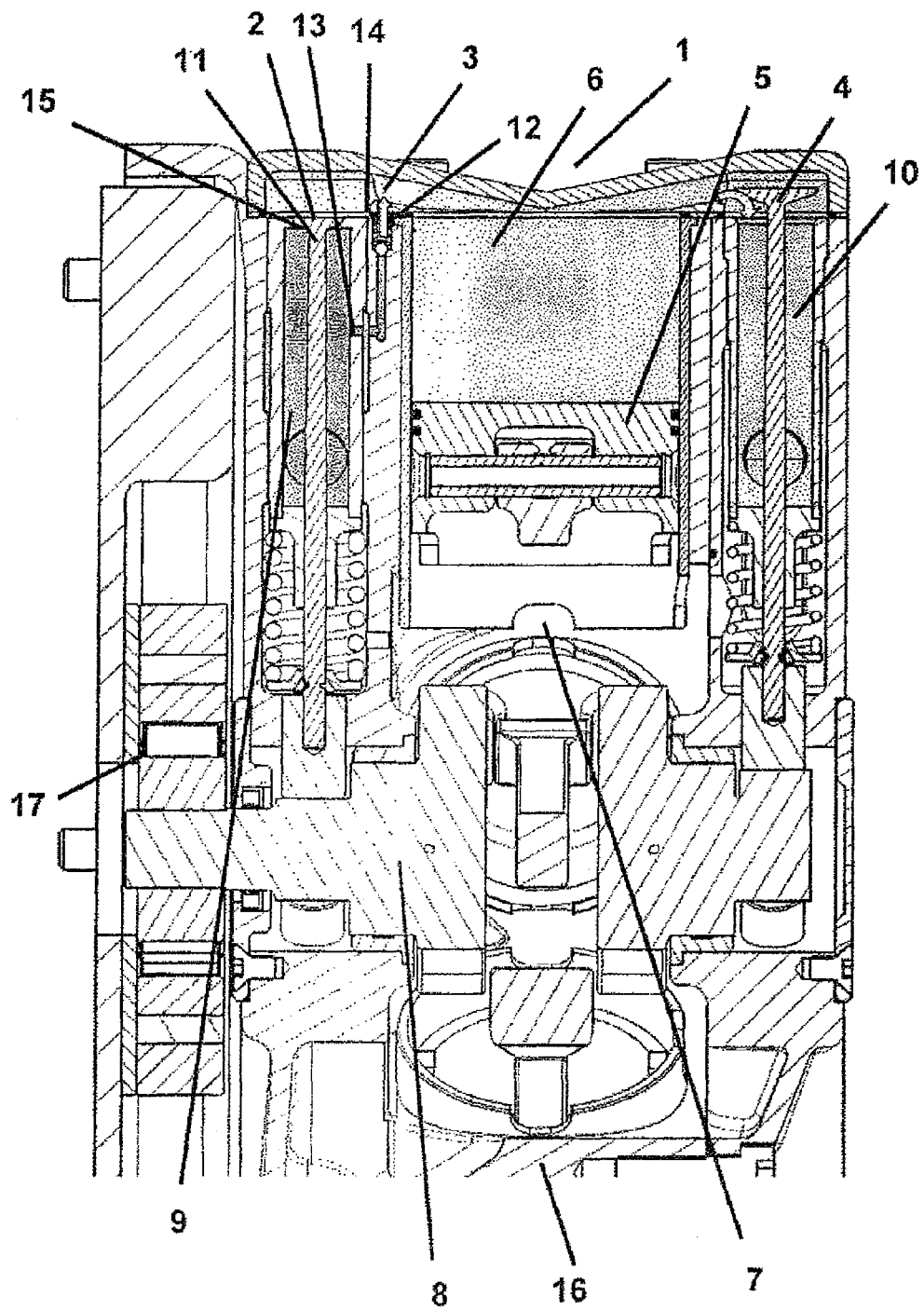
FIG. 5 is the vapor flow when starting from the exhaust phase.

FIG. 5 shows the flow of vapor for independent starting of a reciprocating piston expansion engine in the exhaust phase work cycle. The inlet valve 2 is closed while the outlet valve 4 is open. Vapor again flows out of the fluid supply 9 into the cylinder interior 6 due to the bypass valve 3 being opened by the system pressure in the fluid supply 9. However, due to the open position of the outlet valve 4, no pressure is built up inside the cylinder interior 6 and the piston 5 is not set in motion. As a result of this technical step, the piston 5 does not move in the wrong direction and, therefore, the crankshaft 8 is not rotated in the wrong direction. Accordingly, a starting of the reciprocating piston expansion engine in an unintended direction is effectively prevented.

Figure 6:
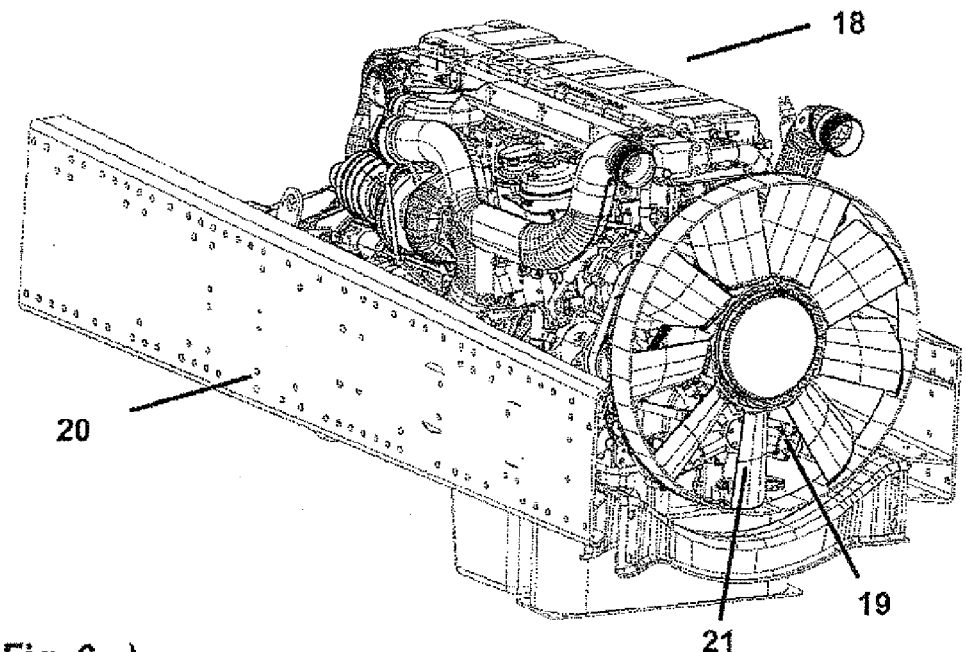
FIG. 6 is the coupling of a reciprocating piston engine constructed according to one embodiment of the invention with an internal combustion engine.
Figure 6:
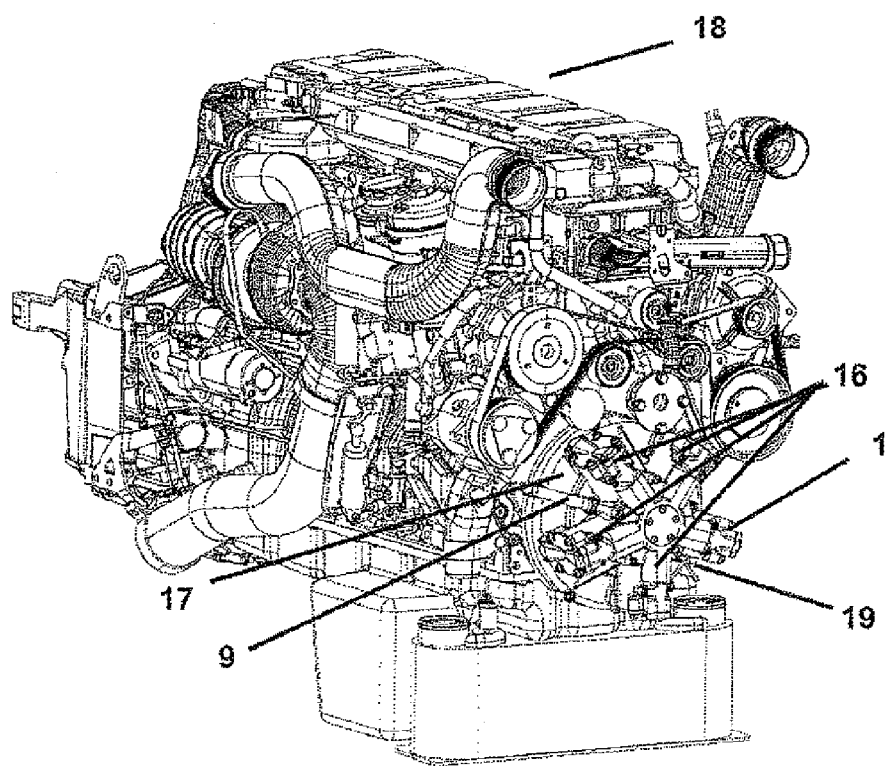

FIG. 6 shows a preferred arrangement of and connection of a reciprocating piston expansion engine 19 constructed according to the invention to an internal combustion engine 18. FIG. 6a shows the installation situation between the frame longitudinal member 20 with the fan wheel 21, while the fan wheel 21 and frame longitudinal member 20 are omitted in FIG. 6b for the sake of clarity.

As shown the reciprocating piston expansion engine 19 has five cylinders 1, and 16 and is constructed as a radial engine arranged between the fan wheel 21 and the internal combustion engine 18. The reciprocating piston expansion engine 19 has a crankshaft 8 (not visible in this view) that is connected to the crankshaft of the internal combustion engine 18 by a freewheel 17 (overrunning clutch) as discussed above. The freewheel 17 ensures that torque is transmitted exclusively from the crankshaft 8 of the reciprocating piston expansion engine to the crankshaft of the internal combustion engine 18 and not in the reverse direction. Thus, a transmission of torque from the crankshaft 8 of the reciprocating piston expansion engine to the crankshaft of the internal combustion engine is carried out whenever there is sufficient vapor for operating the reciprocating piston expansion engine 19 in support of the internal combustion engine 18 and, that there is no operating state in which the internal combustion engine 18 drives (drags) the reciprocating piston expansion engine 19.

The arrangement of a bypass valve 3 that is provided parallel to the inlet valve 2 of a cylinder 1 presents a simple and efficient solution for realizing the self-starting of a reciprocating piston expansion engine that is mechanically connected to an internal combustion engine. Accordingly, it is possible in a particularly preferred manner to utilize the waste heat of a combustion engine, such as a combustion engine in a utility vehicle, using a secondary heat circuit. In so doing, a working medium which is preferably a fluid under normal conditions is changed in the secondary heat circuit into an at least partial vaporous phase and the vapor generated in this way is expanded by means of a reciprocating piston expansion engine in order to convert the energy contained in the waste heat of the internal combustion engine into kinetic energy. The kinetic energy "recycled" in this way which is supplied to the drive unit ultimately provides for an increase in efficiency of the system as a whole. Accordingly, systems which combine a conventional internal combustion engine, particularly a diesel engine, and a vapor-operated reciprocating piston expansion engine in this way directly serve to increase efficiency in a drive unit and therefore lead to a reduction in harmful emissions and costs.

Thus, while there have shown and described and pointed out fundamental novel features of the invention as applied to a preferred embodiment thereof it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive unit comprising:
a reciprocating piston expansion engine, the reciprocating piston expansion engine comprising:
   at least two cylinders;
   a piston arranged in each of the cylinders;
   a supply for each of the at least two cylinders configured to provide a fluid in at least one of a vaporous and gaseous form;
   an inlet valve for each of the at least two cylinders, the inlet valve having an open state configured to provide the fluid from the supply to an interior of a respective one of the at least two cylinders and a closed state configured not to provide the fluid from the supply to the interior of the respective one of the at least two cylinders;
   at least one bypass valve arranged in parallel to a respective one of the inlet valves, the at least one bypass valve configured to provide the fluid from the supply to the interior of the respective one of the at least two cylinders in an open state; and
   a crankshaft to which each of the pistons is coupled;
a combustion engine, the combustion engine comprising a driven shaft; and
a freewheel coupled to the crankshaft configured to transmit torque to the driven shaft.

2. The drive unit according to claim 1, wherein the reciprocating piston expansion engine further comprises an outlet valve for each of the at least two cylinders, the outlet valve having an open state configured to provide the fluid from the interior of the respective one of the at least two cylinders to a fluid discharge and a closed state configured not to provide the fluid from the interior of the respective one of the at least two cylinders to the fluid discharge.

3. The drive unit according to claim 1, wherein an opening cross-section of the bypass valve is 0.1-times to 0.5-times an opening cross-section of the inlet valve.

4. The drive unit according to one of claim 1, wherein the bypass valve is open at least occasionally when the inlet valve is in the closed state.

5. The drive unit according to claim 2, wherein the bypass valve is open at least occasionally when the inlet valve and outlet valve are in the closed state.

6. The drive unit according to claim 1, wherein the bypass valve is configured as a spring-loaded spherical valve.

7. The drive unit according to claim 1, further comprising conveying unit coupled to the inlet valve and the bypass valve for supplying the cylinders with the fluid, wherein the conveying unit and an opening cross section of the bypass valve are configured for a system pressure in the supply to increase when the inlet valve is in the closed state and the bypass valve is in the open state.

8. The drive unit according to claim 1, wherein the reciprocating piston expansion engine has an odd number of cylinders.

9. The drive unit according to claim 8, wherein the reciprocating piston expansion engine has five cylinders.

10. A method for operating a drive unit in which a driven shaft of an internal combustion engine is coupled by a clutch to a crankshaft of an at least two-piston reciprocating piston expansion engine, the method comprising:
   heating a fluid using a waste heat of the internal combustion engine to change the fluid at least partially into at least one of a vaporous and a gaseous phase;
   opening an inlet valve to provide the fluid in the at least one of the vaporous and the gaseous phases into an interior of a cylinder of the reciprocating piston expansion engine via the inlet valve;
   setting a piston that is movably supported within the cylinder and coupled to the crankshaft in motion by expansion of the fluid; and
   opening a bypass valve which is arranged fluidically parallel to the inlet valve when the inlet valve is closed to provide the fluid in the at least one of the vaporous and the gaseous phases into the interior of the cylinder.

11. The method according to claim 10, wherein the bypass valve is opened before an inlet valve is moved.

12. The method according to claim 10, wherein the bypass valve is opened based at least in part on a system pressure in a fluid supply.

13. The method according to claim 11, wherein movement of the inlet valve is caused by a rotation of the crankshaft.

14. The method according to claim 10, wherein each cylinder of the at least two-piston reciprocating expansion engine has a bypass valve fluidically parallel to an inlet valve; and all the bypass valves of the at least two-piston reciprocating piston expansion engine are open before the inlet valves are open.

15. The drive unit according to claim 1, wherein an opening cross-section of the inlet valve is five times an opening cross-section of the bypass valve.

16. The drive unit according to claim 1, wherein the clutch is freewheel.

17. The method according to claim 10, wherein the clutch is freewheel.

18. The drive unit according to claim 1, wherein the input valve and the output valve are moved from their respective open and closed states by rotation of the crankshaft.

* * * * *